United States Patent
Chowdhary et al.

(10) Patent No.: US 12,094,199 B2
(45) Date of Patent: *Sep. 17, 2024

(54) AGRICULTURAL ANALYSIS ROBOTIC SYSTEMS AND METHODS THEREOF

(71) Applicant: Earthsense, Inc., Champaign, IL (US)

(72) Inventors: Girish Chowdhary, Champaign, IL (US); Chinmay Soman, Urbana, IL (US); Michael McGuire, Salem, IL (US); Michael Hansen, Champaign, IL (US)

(73) Assignee: Earthsense, Inc., Champaign, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,079

(22) Filed: May 31, 2023

(65) Prior Publication Data
US 2023/0306735 A1 Sep. 28, 2023

Related U.S. Application Data

(63) Continuation of application No. 17/219,500, filed on Mar. 31, 2021, now abandoned.

(51) Int. Cl.
*G06V 20/10* (2022.01)
*G05D 1/00* (2024.01)
(Continued)

(52) U.S. Cl.
CPC ......... *G06V 20/188* (2022.01); *G05D 1/0246* (2013.01); *G05D 1/249* (2024.01);
(Continued)

(58) Field of Classification Search
CPC ......... G06T 7/50; G06T 7/70; G06T 2210/12; G06T 2207/30188; G06T 2207/30204;
(Continued)

(56) References Cited

U.S. PATENT DOCUMENTS

| 8,504,234 B2 | 8/2013 | Anderson |
| 9,288,938 B2 | 3/2016 | Cavender-Bares et al. |

(Continued)

FOREIGN PATENT DOCUMENTS

| AU | 2016269849 B2 | 12/2016 |
| AU | 2017282723 A1 | 11/2018 |

(Continued)

OTHER PUBLICATIONS

Liu, Xu, et al. "Monocular camera based fruit counting and mapping with semantic data association." IEEE Robotics and Automation Letters 4.3 (2019): 2296-2303. (Year: 2019).*

(Continued)

*Primary Examiner* — Vu Le
*Assistant Examiner* — Tracy Mangialaschi
(74) *Attorney, Agent, or Firm* — Shumaker, Loop & Kendrick, LLP

(57) ABSTRACT

A method, non-transitory computer readable medium, and system that manage agricultural analysis in dynamic environments includes detecting a location of one or more agricultural objects of interest in image data of an environment captured by a sensor device during active navigation of the environment. An orientation and position of the sensor device with respect to the image data is determined. Each of the one or more agricultural objects of interest is analyzed based on the image data, the detected location of the one or more agricultural objects of interest, and the determined orientation and position of the sensor device to determine one or more characteristics about the one or more agricultural objects of interest. At least one action is initiated based on the determined one or more characteristics about the one or more agricultural objects of interest.

23 Claims, 7 Drawing Sheets

(51) Int. Cl.
| | |
|---|---|
| G05D 1/249 | (2024.01) |
| G06N 3/08 | (2023.01) |
| G06T 7/50 | (2017.01) |
| G06T 7/70 | (2017.01) |
| G06V 10/25 | (2022.01) |

(52) U.S. Cl.
CPC ............... *G06N 3/08* (2013.01); *G06T 7/50* (2017.01); *G06T 7/70* (2017.01); *G06V 10/25* (2022.01); *G06T 2207/20084* (2013.01); *G06T 2207/30188* (2013.01); *G06T 2207/30204* (2013.01); *G06T 2207/30242* (2013.01); *G06T 2210/12* (2013.01)

(58) Field of Classification Search
CPC ........... G06T 2207/30242; G06T 2207/20084; G06V 10/25; G06V 10/82; G06V 10/803; G06V 20/188; G06V 20/56; G05D 1/0246; G05D 1/0248; G05D 2201/0207; G05D 2201/0201; G05D 1/249; G06N 3/08
See application file for complete search history.

(56) References Cited

U.S. PATENT DOCUMENTS

| | | | |
|---|---|---|---|
| 9,392,743 | B2 | 7/2016 | Camacho-Cook et al. |
| 10,123,473 | B2 | 11/2018 | Cavender-Bares et al. |
| 10,874,044 | B2 | 12/2020 | Cavender-Bares et al. |
| 10,890,912 | B2 | 1/2021 | Cavender-Bares et al. |
| 2019/0366762 | A1 | 12/2019 | Cavender-Bares et al. |
| 2022/0318552 | A1 | 10/2022 | Chowdhary et al. |

FOREIGN PATENT DOCUMENTS

| | | | | |
|---|---|---|---|---|
| AU | 2018204155 A1 | 1/2019 | | |
| CA | 2930849 A1 | 5/2015 | | |
| CN | 102428770 A | 5/2012 | | |
| WO | 2017219072 A1 | 12/2017 | | |
| WO | 2018136875 A1 | 7/2018 | | |
| WO | WO-2019040866 A2 | * | 2/2019 | ........... G05D 1/0246 |
| WO | 2019040866 A3 | 4/2019 | | |

OTHER PUBLICATIONS

Chen, Steven W., et al. "Counting apples and oranges with deep learning: A data-driven approach." IEEE Robotics and Automation Letters 2.2 (2017): 781-788. (Year: 2017).*

Huang, Yi Hsuan, and Ta Te Lin. "High-throughput image analysis framework for fruit detection, localization and measurement from video streams." 2019 ASABE Annual International Meeting. American Society of Agricultural and Biological Engineers, 2019. (Year: 2019).*

Compant, S., et al. "The plant endosphere world-bacterial life within plants." Environmental Microbiology 23.4 (2020): 1812-1829. (Year: 2020).*

Sarthak Sharma, et al, Beyond Pixels: Leveraging Geometry and Shape Cues for Online Multi-Object Tracking, arXiv, Jul. 27, 2018, 1802.09298v2 [cs.RO], Ithaca, New York, United States of America.

Nicolai Wojke, et al, Simple Online and Realtime Tracking with a Deep Association Matrix, arXiv, Mar. 21, 2017, 1703.07402v1 [cs.CV] Mar. 21, 2017, Ithaca, New York, United States of America.

Jonathon Luiten, et al, Track to Reconstruct and Reconstruct to Track, arXiv:1910.00130v3 [cs.CV] Apr. 19, 2020, IEEE Robotics & Automation Society, United States of America.

Paul S Blaer, et al, Data Acquisition and View Planning for 3-D Modeling Tasks, IEEE Xplore, Dec. 10, 2007, IEEE/RSJ International Conference on Intelligent Robots and Systems, San Diego, California, United States of America.

Michael Krainin, et al, Autonomous Generation of Complete 3D Object Models Using Next Best View Manipulation Planning, Special Issue on Semantic Perception for Robots in Indoor Environments, Jul. 7, 2011, p. 1311-1327, vol. 30 issue 11, Department of Computer Science & Engineering, University of Washington, Washington DC, Intel Labs Seattle, United States of America.

Chang Chen, et al, A review of visual-inertial simultaneous localization and mapping from filtering-based and optimization-based perspectives. Robotics, Aug. 15, 2018, vol. 7(3) Article 45, Multidisciplinary Digital Publishing Institute, Basel, Switzerland.

Aljosa Osep, et al, Track, then Decide: Category-Agnostic Vision-based Multi-Object Tracking, arXiv:1712.07920v1 [cs.CV] Dec. 21, 2017, IEEE Robotics & Automation Society, United States of America.

Kai Chen et al, Hybrid Task Cascade for Instance Segmentation, arXiv:1901.07518v2 [cs.CV] Apr. 9, 2019, p. 1-10, The Chinese University of Hong Kong, The University of Sydney, Nanyang Technological University.

Morgan Quigley et al, ROS: an open-source Robot Operating System, Computer Science Department, University of Southern California, p. 1-6, May 12, 2009.

Takafumi Taketomi et al, Visual SLAM algorithms: a survey from 2010 to 2016, IPSJ Transactions on Computer Vision and Applications, Jun. 2, 2017, vol. 9 (16), p. 1-11, DOI 10.1186/s41074-017-0027-2, Information Processing Society of Japan, Tokyo, Japan.

Huang, Yi Hsuan and Ta Te Lin, "High-throughout image analysis framework for fruit detection, localization and measurement from video streams", 2019 ASABE Annual International Meeting. American Society of Agricultural and Biological Engineers, 2019 (Year: 2019).

* cited by examiner

AGRICULTURAL ANALYSIS ROBOTIC SYSTEMS AND METHODS THEREOF

CROSS REFERENCE TO RELATED APPLICATIONS

The present application is the continuation of U.S. patent application Ser. No. 17/219,500 filed on. Mar. 31, 2021.

FIELD

This technology relates to robotic systems and methods that manage agricultural analysis in dynamic environments.

BACKGROUND

Obtaining accurate measurements of agricultural objects of interest, such as agricultural products, in dynamic environments can be very challenging. By way of example, corn ear height is a difficult to measure, yet critical crop trait that both harvesters and researchers are interested in. Corn ear height is a key variable in ensuring proper operation of harvesting machines, corn stalk lodging in the presence of wind, yield and crowding response, and plant health. By way of another example, soybean pod count is difficult to measure, yet a critical top trait that both harvesters and researchers are interested in. It is a key variable relating to soybean yield that can provide early information for pricing of commodities and help breeders in identifying top performing varieties.

Conventional methods rely on random sampling of a few plants in a field or a small part of the field (such as a breeding plot) and use these random samplings to estimate the average corn ear height or soybean pod count. The particular height measurements in these random samplings are manually made by humans agronomists) using different types of manual distance measuring devices, such as tape measures, poles, or laser altimeters, or manual counting.

Unfortunately, these conventional methods are highly inefficient, due to their heavy reliance on human labor and yields data that is not always entirely consistent across different obtained measurements. Further, the particular selection of plants to be measured by the agronomists may introduce a selection bias that inaccurately skews the statistics of the average corn ear height. As a result, many actionable decisions which rely on these measurements may be negatively impacted by these errors resulting from these prior inefficient and unreliable measurement techniques.

SUMMARY

A method for managing agricultural analysis in dynamic environments includes detecting, by a computing device, a location of one or more agricultural objects of interest in image data of an environment captured by a sensor device during active navigation of the environment. An orientation and position of the sensor device with respect to the image data is determined, by the computing device. Each of the one or more agricultural objects of interest is analyzed, by the computing device, based on the image data, the detected location of the one or more agricultural objects of interest, and the determined orientation and position of the sensor device to determine one or more characteristics about the one or more agricultural objects of interest. At least one action is initiated, by the computing device, based on the determined one or more characteristics about the one or more agricultural objects of interest.

A robotic system includes one or more sensor devices, a driving system, and a management computing device. The management computing device is coupled to the one or more sensors and the driving system and comprises a memory comprising programmed instructions stored thereon and one or more processors configured to be capable of executing the stored programmed instructions to detect a location of one or more agricultural objects of interest in image data of an environment captured by a sensor device during active navigation of the environment. An orientation and position of the sensor device with respect to the image data is determined. Each of the one or more agricultural objects of interest is analyzed based on the image data, the detected location of the one or more agricultural objects of interest, and the determined orientation and position of the sensor device to determine one or more characteristics about the one or more agricultural objects of interest. At least one action is initiated based on the determined one or more characteristics about the one or more agricultural objects of interest.

A non-transitory computer readable medium having stored thereon instructions comprising executable code which when executed by one or more processors, causes the one or more processors to detect a location of one or more agricultural objects of interest in image data of an environment captured by a sensor device during active navigation of the environment. An orientation and position of the sensor device with respect to the image data is determined. Each of the one or more agricultural objects of interest is analyzed based on the image data, the detected location of the one or more agricultural objects of interest, and the determined orientation and position of the sensor device to determine one or more characteristics about the one or more agricultural objects of interest. At least one action is initiated based on the determined one or more characteristics about the one or more agricultural objects of interest.

This technology provides a number of advantages including providing robotic systems and methods that accurately, efficiently, and reliably manage agricultural analysis in dynamic environments. With examples of this technology, fast, cheap, and reliable measurements of agricultural objects of interest, such as corn ear height, soybean pod count, or other agricultural products, can be obtained with a high level of accuracy. Additionally, examples of this technology provide a robotic system which can provide a fully automated measurement system for agricultural objects of interest, such as corn ear height, soybean pod count, or other agricultural products, in an entire agricultural field or other dynamic environment without needing any human intervention. With examples of this technology, a variety of different characteristics may be determined, such as measurements of the height or geometry (distance, angle, volume, etc.) of any object of interest, such as an organ of a plant, including but not limited to, leaves, tassels, stem, brace roots, etc., or counts of the objects of interest and/or makers or other features on the objects of interest. Further, with examples of this technology these different measurements may be analyzed and used to initiate one or more actions related to the agricultural objects of interest.

DETAILED DESCRIPTION

Figure 1:
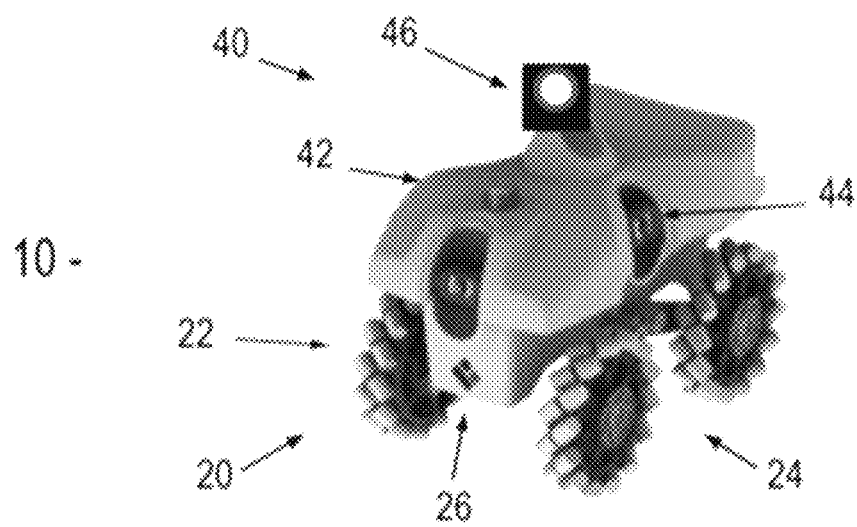
FIG. 1 is a perspective view of an example of an agricultural analysis robotic system.
Figure 2:
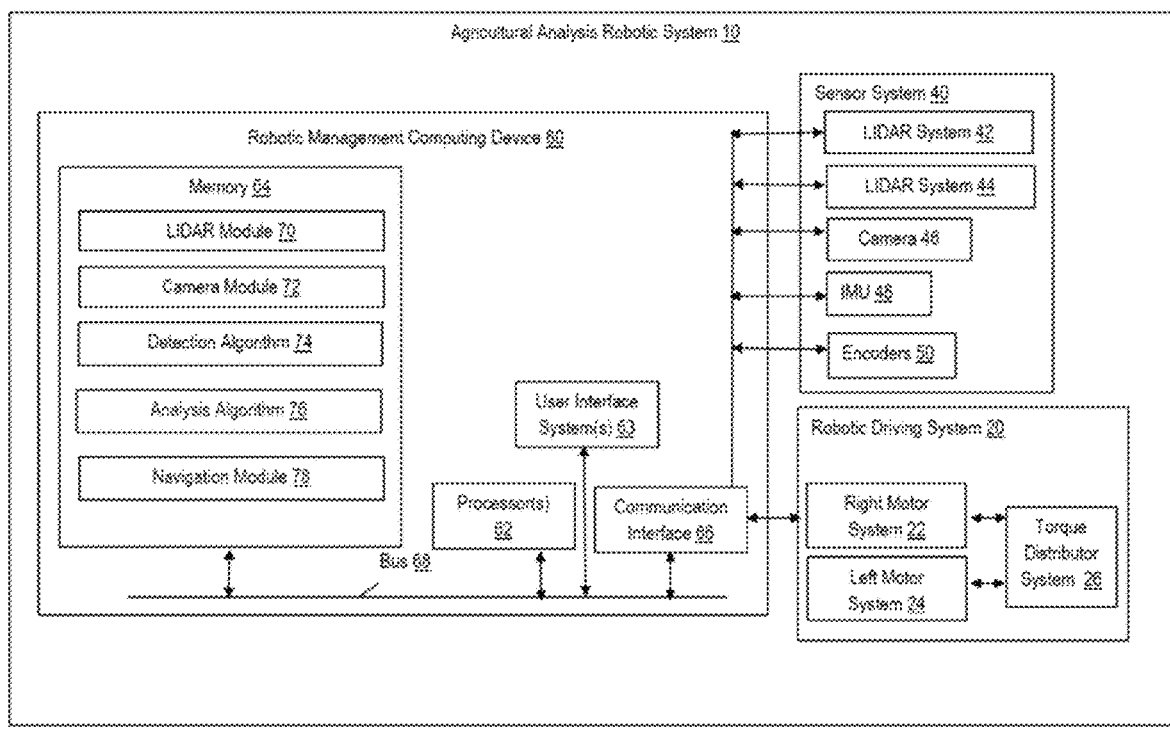
FIG. 2 is a block diagram of the example of the agricultural analysis robotic system shown in FIG. 1.

An exemplary agricultural analysis robotic system 10 is shown in FIGS. 1-2. In this example, the agricultural analysis robotic system 10 includes a robotic driving system 20, a sensor system 40, and a robotic management computing device 60, although the systems may comprise other types and/or numbers of other systems, devices, components, and/or other elements in other configurations. This technology provides a number of advantages including providing systems, methods, and non-transitory computer readable media that accurately, efficiently and reliably manage agricultural analysis in dynamic environments.

Referring to more specifically to FIGS. 1-2, in this example the robotic driving system 20 is a fully automated and self-propelled motor vehicle that is used to drive the robotic system 10 in the dynamic environment, although other types of systems to enable movement of the robotic system 10 may be used. In this example, the robotic driving system 20 includes all of the parts of a motor vehicle system including, by way of example, a body, engine, fuel system, steering system, brake system, powertrain, and wheels and. Additionally, in this example, the robotic driving system 20 has right and left motor systems 22 and 24 which are coupled to a torque distributor system 26 that is driven by powertrain powered by a motor coupled to a fuel source, such as a battery by way of example, and whose operation is managed by a motor controller, such as robotic management computing device 60 by way of example only, although other types and/or numbers of systems, devices, components and/or other elements to enable automated guided motorized movement of the robotic system 10 in the dynamic environment may be used. By way of example only, an exemplary robotic driving system or vehicle which could be used is illustrated and described by way of example in WO 2019/040866, which is herein incorporated by reference in its entirety.

The robotic driving system 20 may use an omnidirectional drive system, such as a Mecanum drive system with Mecanum wheels or other drive system by way of example, which is able to move in any direction without the need to change orientation before or while moving, although other types of drive systems may be used. Accordingly, in this particular example the Mecanum drive system shortens the time required for the robotic driving system 20 to react in the dynamic environment which is advantageous. Additionally, and by way of example only, the robotic system 10 with this robotic driving system 20 may have a length of about 21.5 inches and a width of about 12 inches to minimize the overall footprint of the robotic system 10 and further enhance maneuverability, although the robotic system 10 could have other dimensions depending on the particular dynamic environment, such as an agricultural field.

To enhance balance, the robotic driving system 20 may arrange components of the motor system which are heavier towards the bottom of a housing for the robotic driving system 20, such as the battery or other power or fuel source by way of example. The robotic driving system 20 may also comprise or otherwise house or support other types and/or numbers of other systems, devices, components, and/or other elements in other configurations.

The sensor system 40 may include light detection and ranging (LIDAR) systems 42-44, the camera 46, the inertial measurement unit (IMU) 48, and the encoders 50 which may be housed on the robotic driving system 20 and/or one or more mounted on a gimbal, although one or more of these systems, devices, components or other elements could be at other locations in other examples and other types and/or numbers of sensors may be used. The light detection and ranging (LIDAR) systems 42-44, the camera 46, the inertial measurement unit (IMU) 48, and the encoders 50 are each coupled to the robotic management computing device 60, although each may have other types and/or numbers of connections to other systems, devices, components and/or other elements to enable the automated guided and targeted disinfection as illustrated and described by way of the examples herein.

In this example, the camera 46 in this example may be a monocular camera and is located on a gimbal on top of the robotic drive system 20, although other types of cameras may be used such as a depth-sensing camera, such as the ZED or Intel RealSense cameras by way of example, to more directly detect and measure the location and position of the organ of interest, such as an ear of corn, may be used. The camera 46 may be used to measure the angle and depth of an object of interest in a dynamic environment, such as an agricultural field. Additionally, the light detection and ranging (LIDAR) systems 42-44 are each located on the housing for the robotic driving system 20, although other types and/or numbers of imaging systems may be used.

In this example, the inertial measurement unit (IMU) 48 is in the robotic driving system 20, is coupled to the robotic management computing device 60, and may measure and report data, such as a specific force, angular rate, and orientation of the robotic system 10 in this example using a combination of accelerometers, gyroscopes, and/or magnetometers, although other types and/or numbers of measurement devices may be used by the robotic system 10. Additionally, the encoders 50 are in the robotic driving system 20, are coupled to the robotic management computing device 60, and are configured convert motion of the robotic system 10 to an electrical signal that can be read by the robotic management computing device 60 to control motion of the robotic system 10.

The robotic management computing device 60 is coupled to the robotic driving system 20 and the sensor system 40 and may execute any number of functions and/or other operations including managing agricultural measurement in dynamic environments as illustrated and described by way of the examples herein. In this particular example, the robotic management computing device 60 includes one or more processor(s) 62, a user interface 63, a memory 64, and/or a communication interface 66, which are coupled together by a bus or other communication link 68, although the robotic management computing device 60 can include other types and/or numbers of elements in other configurations.

The processor(s) 62 of the robotic management computing device 60 may execute programmed instructions stored in the memory of the robotic management computing device 60 for any number of functions and other operations as illustrated and described by way of the examples herein. The processor(s) 62 of the robotic management computing device 60 may include one or more CPUs or general purpose processors with one or more processing cores, for example, although other types of processor(s) can also be used.

The user interface 63, may comprise one or more of devices or system, such as a display, a keyboard, a mouse, interactive audio command system, and/or an interactive display by way of example, in the robotic system 10, although in other examples the user interface may be remotely connected to the robotic system 10 via one or more communications systems.

The memory 64 of the robotic management computing device 60 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory 64.

Accordingly, the memory 64 of the robotic management computing device 60 can store one or more applications that can include computer executable instructions that, when executed by the robotic management computing device 60, cause the robotic management computing device 60 to perform actions, such as to managing agricultural measurement in a dynamic environment, and other actions as described and illustrated in the examples below with reference to FIGS. 1-8. The application(s) can be implemented as modules, programmed instructions or components of other applications. Further, the application(s) can be implemented as operating system extensions, module, plugins, or the like.

Even further, the application(s) may be operative in a cloud-based computing environment coupled to the robotic system 10. The application(s) can be executed within or as virtual machine(s) or virtual server(s) that may be managed in a cloud-based computing environment. Also, the application(s), and even the robotic management computing device 60 itself, may be located in virtual server(s) running in a cloud-based computing environment rather than being tied to one or more specific physical computing devices in the robotic system 10. Also, the application(s) may be running in one or more virtual machines (VMs) executing on the robotic management computing device 60. Additionally, in one or more embodiments of this technology, virtual machine(s) running on the robotic management computing device 60 may be managed or supervised by a hypervisor.

In this particular example, the memory 64 of the robotic management computing device 60 may include a LIDAR module 70, a camera module 72, an object detection algorithm 74, an analysis algorithm 76, and a navigation module 78 which may be executed as illustrated and described by way of the examples herein, although the memory 64 can for example include other types and/or numbers of modules, platforms, algorithms, programmed instructions, applications, or databases for implementing examples of this technology.

The LIDAR module 70 and camera module 72 may comprise executable instructions that are configured to process imaging data captured by the LIDAR systems 42 and 44 and the camera 46 as illustrated and described in greater detail by way of the examples herein, although each of these modules may have executable instructions that are configured to execute other types and/or functions or other operations to facilitate examples of this technology.

Additionally, in this example the detection algorithm 74 may comprise executable instructions that are configured to identify an object of interest, such as an agricultural product in a field, in the imaging data captured by the sensor system, such as one or more of the LIDAR systems 42 and 44 and/or the camera 46, although this algorithm may have executable instructions that are configured to execute other types and/or functions or other operations to facilitate examples of this technology.

The analysis algorithm 76 may comprise executable instructions that are configured to generate one or more measurements related to the object of interest, such as a height or geometry (distance, angle, volume, etc.) of the organ of interest detected by the detection algorithm 74 in the imaging data.

The navigation module 78 may comprise executable instructions that are configured to enable autonomous navigation of the robotic system 10 without use of a global position system (GPS) and which adjust to the dynamic environment as illustrated and described in greater detail by way of the examples herein, although this module may have executable instructions that are configured to execute other types and/or functions or other operations to facilitate examples of this technology. In this particular example, the navigation module 38 does not use and the robotic system 10 does not have a global positioning system (GPS). In other examples, GPS or other systems which simulate or otherwise facilitate use of GPS could be used by the navigation module 38 to manage or assist navigation of the robotic system 10.

The communication interface 66 of the robotic management computing device 60 operatively couples and communicates between the robotic management computing device 60 and the robotic driving system 20 and the sensor system 40, which are all coupled together, although other types and/or numbers of connections and/or communication networks can be used.

While the robotic management computing device 60 is illustrated in this example as including a single device, the robotic management computing device 60 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the robotic management computing device 60.

Additionally, one or more of the devices that together comprise the robotic management computing device 60 in other examples can be standalone devices or integrated with one or more other devices or apparatuses, such as in one of the server devices or in one or more computing devices for example. Moreover, one or more of the devices of the robotic management computing device 60 in these examples can be in a same or a different communication network including one or more public, private, or cloud networks, for example.

Although an exemplary robotic management computing device 60 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in this agricultural analysis robotic system 10, such as the robotic management computing device 60, for example, may be configured to operate as virtual instances on the same physical machine. In other words, by way of example one or more of the robotic management computing device 60 may operate on the same physical device rather than as separate devices communicating through communication network(s). Additionally, there may be more or fewer robotic management computing device 60 than illustrated in FIG. 2.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
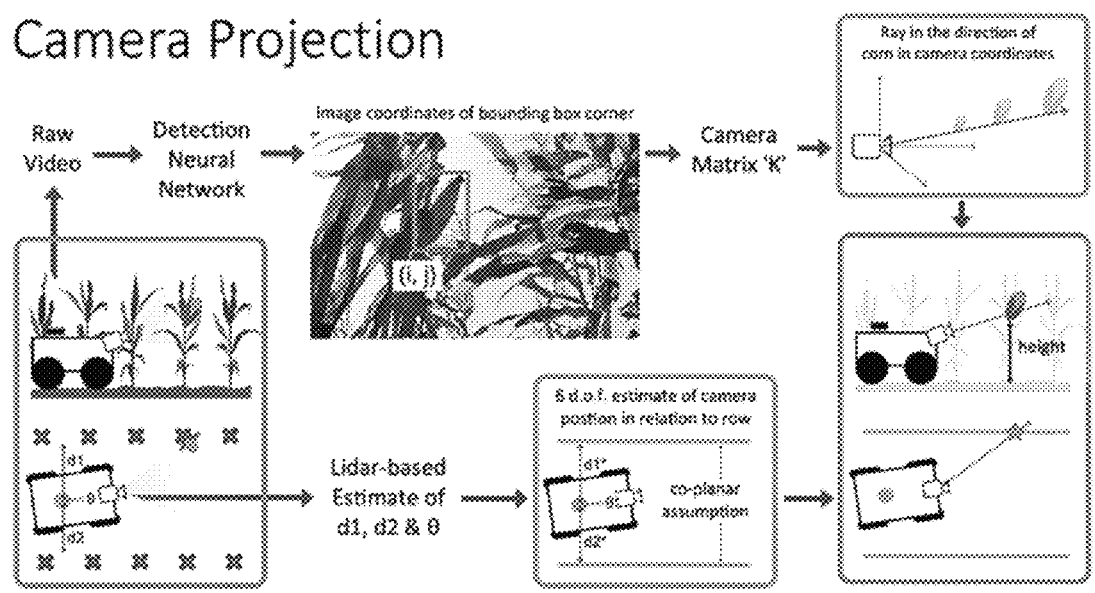
FIG. 3 is a functional block diagram of an example of operation of the agricultural analysis robotic system shown in FIGS. 1 and 2.
Figure 4:
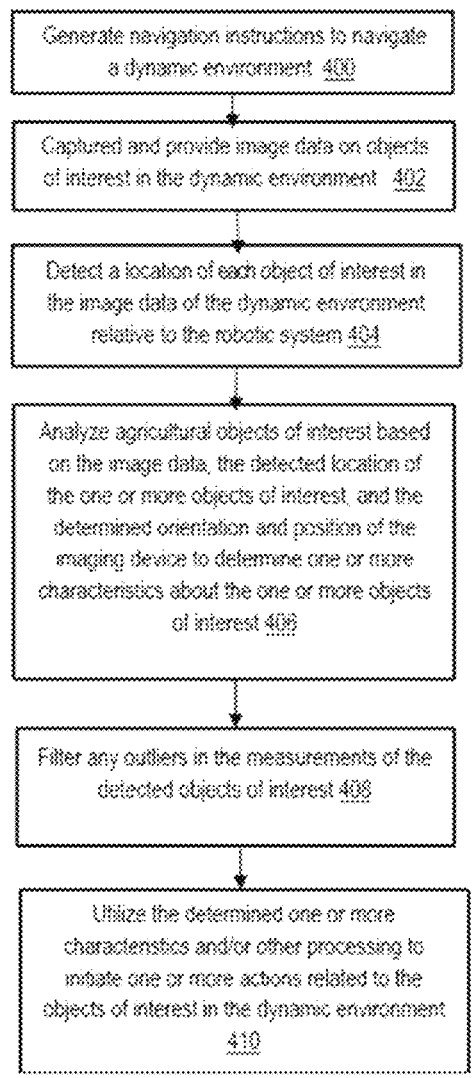
FIG. 4 is a flowchart of an example of a method for managing agricultural analysis in a dynamic environment.

An exemplary method for managing agricultural measurement in a dynamic environment with the robotic system 10 will now be described with reference to FIGS. 1-8. Referring more specifically to FIGS. 3-4, in this example in step 400, the robotic management computing device 60 may execute the navigation module 78 to generate navigation instructions to the robotic drive system 20 to navigate a dynamic environment where one or more aspects may change, such as an agricultural field with a rows of corn or other plants which are growing and/or may be experiencing one or more issues, like infestation or wind damage by way of example only. To generate the navigation instructions so that the robotic drive system 20 can navigate a dynamic environment, the robotic management computing device 60 may obtain a map or other layout data of the environment, although other manners for obtaining layout data to generate navigation instructions may be used. By way of another example, the robotic management computing device 60 may execute the navigation module 78 to generate navigation instructions to the robotic drive system 20 to first scout the dynamic environment based on scout data collection program instructions in the navigation model which may be input and/or modified by an operator via the user interface 63 which again may be on or be in a remotely tablet or other computing device coupled to the robotic system 10. In another example, the robotic management computing device 60 may generate the navigation instructions in real time based on imaging data captured and received from one or more of the LIDAR systems 42 and 44 and/or the camera 46 as well as other positioning data from the IMU 48 and encoders 50 which may be used by the navigation module 78, although again other approaches may be used to guide the robotic system 10 in the dynamic environment. In further examples, the captured image and other data about the dynamic environment may be transmitted from the robotic management computing device 60 to an edge station with an edge computing system at or near the environment and/or to a cloud computing system coupled to the robotic management computing device 60 to process the layout data of the environment and generate navigation instructions.

With respect to the layout data for the environment, the robotic management computing device 60 may associating each of a plurality of geographic locations or areas in the environment with a unique experimental unit (EU) ID based on a field plan for dividing up the environment and later may associate the EU ID with the determined measurements and other analysis, although other manners for dividing parts of the environment and assigning unique identifiers may be used. By way of example, each EU ID could be assigned to a different type of plant in different areas of the environment. In another example, the robotic management computing device 60 in the robotic system 10 may be configured to recognize and be able to interact with markers, such as RFID tags, placed in the field to define and associate an EU ID with each particular section or area of the environment. The EU ID associated with the measurements and/or other analysis by the robotic management computing device 60 provides precise location details for the environment and for managing any initiated actions as described in examples further herein.

In step 402, the robotic management computing device 60 may execute the camera module 72 to capture and receive image data from the camera 46 on the agricultural objects of interest in the dynamic environment, such as ears of corn in rows in an agricultural field by way of example, although other types imaging data may be captured and provide to the robotic management computing device 60, such as imaging data from one or more of the LIDAR system 42 and 44 by way of example. Additionally, in one example, the camera 46 is a monocular camera and is located on a gimbal on top of the robotic drive system 20, although other types of cameras may be used such as a depth-sensing camera by way of example. The navigation module 78 executed by the robotic management computing device 60 may also generate and provide a sequence of the agricultural objects of interest or Experimental Units (EUs) for the camera to capture image data and also one what types of condition data to record, such as specific times of image data capture, lighting conditions, and/or other current conditions by way of example, that may be used when analyzing the collected image data.

In step 404, the robotic management computing device 60 may execute the detection algorithm 74, such as a detection neural network or other deep learning technique by way of example, to process the received image data from the monocular camera 46 to determine a location of an object of interest, such as a coordinates or a bounding box of where a corn ear or soybean pod, is detected by way of example.

A training method for the detection algorithm 74, such as a detection neural network or other deep learning technique by way of example, may also advantageously be trained on separate data from different types of the same crops or other agricultural objects of interest and/or other corps and agricultural objects of interest to ensure the neural network layers are adapted to a specific selected crop or other agricultural object of interest. This example of the training helps to refine the detection accuracy of the neural network or other deep learning technique, although other types of training data on other objects of interest could be used in the training.

In another example, the robotic management computing device 60 may initially train the detection algorithm 74, such as a detection neural network or other deep learning technique, by transferring weights from a detection neural network trained for a previously selected crop or other agricultural object of interest to the current detection neural network in the detection algorithm 76.

In yet another example, the robotic management computing device 60 may enable training of the detection algorithm 74, such as a detection neural network or other deep learning technique, using sequence labeling where, for example, an operator: labels via a user interface 63 (which again may be remotely connected to the robotic management computing device 60 in the robotic system 10) each unique instance of an object of interest or marker across multiple consecutive video frames; or trains a plot splitting neural network by marking divisions between consecutive plots in the agricultural field to be used by the robotic system 10 to manage navigation optimized for the particular requested analysis, although other types of operator inputs to train the detection algorithm 76 may be used.

In a further example, the robotic management computing device 60 may enable training of the detection algorithm 74, such as a detection neural network or other deep learning technique, on prior stored images of objects of interest in a variety of different imaging conditions where different related types of each of one or more agricultural objects of interest have already been identified and a set of new images of one or more agricultural objects of interest. By way of example, detecting organs of plants, such as corn ears or soybean pods, is a particularly difficult and challenging task due to different imaging conditions, such as large amounts of visual clutter, motion blur, and harsh and changing lighting conditions, as well as the different visual appearance of ears, pods, or other agricultural objects of interest on different phenotypes which can occur so this unique training based on condition data further enhances detection and analysis of objects of interest.

In yet other examples of this technology, the detection algorithm 74 may be designed to include an object detector which outputs a bounding box for each detected object of interest, such as a corn ear or soybean pod as shown in FIG. 3, or an instance segmentation model, which outputs a pixel mask for each corn ear. In this example, at run-time, individual frames from the video from camera 46, which is collected at 30 FPS and a resolution of 720×1280, are fed into the detection algorithm 76, which returns bounding boxes or masks of each detected object of interest, such as a corn ear. The returned bounding boxes can be used to find the image coordinate(s), $P_i=[u\ v\ 1]^T$, of the object interest from which analysis, such as measurements and/or the determined geometry of each of the agricultural objects of interest and/or counts of the objects off interest and/or markers on the objects of interest, can be determined. By way of example, the markers may be discolorations, blemishes, textural changes, and/or structural changes in the object of interest, although other types of markers may be detected.

In step 406, the robotic management computing device 60 may execute the analysis algorithm 76 to analyze each of the one or more agricultural objects of interest based on the captured image data, the detected location of the one or more agricultural objects of interest, and the determined orientation and position of the imaging device to determine one or more characteristics about the one or more agricultural objects of interest, although other types and/or numbers of other factors may be analyzed.

By way of example, the executed analysis by the robotic management computing device 60 may comprise calculating or otherwise generating one or more measurements of each of the agricultural objects of interest. In this example, the analysis algorithm 76 executed by the robotic management computing device 60 may use imaging data from horizontal LIDAR scans from LIDAR systems 42 and 44 and position data from IMU sensors 48 to determine the position and/or orientation of the robotic system 10 and/or camera 46 relative to a row in which each of the agricultural objects of interest, such as corn ears by way of example, lie to determine a plane on which each of the agricultural objects of interest, such as corn ears in this example, must lie.

Additionally, the analysis algorithm 76 executed by the robotic management computing device 60 may use data obtained related to each of the detected agricultural objects of interest, such as the bounding box, as well as data related to the position of the robotic system 10 and/or camera 46 to determine a separate ray along which each of the agricultural objects of interest, such as a corn ears by way of example, must lie relative to the robotic system 10.

Further, in this example the analysis algorithm 76 executed by the robotic management computing device 60 may assume that all corn plants, soybean plants or other agricultural plants are in a row and thus are co-planar to a large extent. This assumption works in this example because rows in agricultural fields typically are planted to be straight and corn plants, soybean plants or other agricultural plants largely grow straight up. This row or plane provides a surface onto which the ray can be projected from the determined geometric model and position of the camera 46 with respect to the row. By finding the intersection, of this ray and plane by execution of the analysis algorithm 76 by the robotic management computing device 60 measurements of each of the agricultural objects of interest, such as a height and/or geometry of each of the corn ears, soybean pods or other agricultural objects of interest can be determined.

In other examples, when the camera 46 is a depth-sensing camera then a more direct detection and generation of one or more measurements of the agricultural objects of interest may be obtained by execution of the detection algorithm 74 and the analysis algorithm 76 by the robotic management computing device 60. With a depth camera 46, determination of the location of the row does not need to be determined and only the orientation and position of the camera 46 relative to the ground needs to be determined to then generate measurements of the detected agricultural objects of interest in the imaging data with respect to the camera 46.

By way of a further example, the robotic management computing device 60 may determine intrinsic and extrinsic camera parameters. To estimate K, the camera intrinsic matrix, along with distortion coefficients, are generally estimated by the robotic management computing device 60 from the captured image data. In a linear case, K would transform a point from image coordinates $P_i=[u\ v]^T$ to its corresponding camera coordinate $P_c=[x_c\ y_c\ 1]^T$. K is estimated from n point correspondences and solving $$[P_{i1} \ldots P_{in}]=K[P_{c1} \ldots P_{cn}] \qquad (1)$$

with a regression solver by the robotic management computing device 60 since the problem is over constrained when n>4. The matrix K may also be estimated by the robotic management computing device 60 for each robotic system 10 using historic data or visual calibration steps.

With respect to the distortion coefficients, some cameras, such as camera 46, may have lens distortion which causes the mapping between the image coordinates and camera coordinates to become non-linear. Almost always, this mapping remains one-to-one within the field of view of the camera 46, meaning a bidirectional mapping exists for all $P_i/P_c$ within the camera view. Despite this, the mapping must be modified to include distortion as a parameter, and then solved by the robotic management computing device 60 using an solver, such as non-linear least squares result.

With respect to the extrinsic camera parameters, in an ideal world, the extrinsic camera matrix, $[R_c^T|-R_c^T C]=[R|t]$ where $R_c$ is the rotation of the camera 46 and C is the location of the camera 46 in the world frame. During data collection, the robotic drive system 20 of the robotic system 10 does its best to drive straight, and camera 46 is set to a target pitch that maximizes visibility of the agricultural objects of interest, such as corn ears. However, the inevitable bumps and obstacles of the field environment mean that the true values of R and C often deviate from their targets and change in real-time. As a result, the robotic management computing device 60 derives estimates for these values from a variety of sensors, including the on-board IMU 48, encoders 48, and sometimes the LIDAR 42 and/or 44 by way of example. The readings from the IMU 48 provide roll of the robotic system 10 and pitch estimates of the camera 46, while the analysis algorithm 76 is executed by the robotic management computing device 60 to determine yaw and distance relative to the planes on which the agricultural objects of interest, such as corn ears, are assumed to lie. There will be noise in these estimates since most of the sensors, such as IMU 48, encoders 48, and/or LIDAR 42 and/or 44 are recorded at 5 Hz, while the camera 46 is 30 Hz, so the signals are smoothed and interpolated.

Next, an example of determining measurements of agricultural objects of interest by execution of the analysis algorithm 76 by the robotic management computing device 60 when the camera 46 is a monocular camera is set forth below. In this example, K, R, t and $P_i$ may be determined as set forth in the examples above. Next, the analysis algorithm 76 executed by the robotic management computing device 60 uses w is the scaling factor which ensures that $P_i$ remains a homogenous coordinate, and $P_w$ is the point in world, coordinates. The distance, d, to the row is a known quantity from LIDAR 42 and 44. Therefore, $P_w=[d\ y\ z]^T$.

Remember that the camera model is defined up a scale w by $$wP_i = KP_c \quad (2)$$

Where camera coordinates $P_c$ is.

$$P_c = [R|t]P_w \quad (3)$$

Simplifying equations (2) and (3) above with the robotic management computing device 60 gives.

$$wR^T K^{-1} P_i + C = P_w \quad (4)$$

Finally, to solve for w using the planar assumption and associated estimates:

$$w = \frac{d - C0}{(R^T K^{-1} Pi)0} \quad (5)$$

Once w is determined, $P_w$ is easily determined by equation (4) by the robotic management computing device 60. The y coordinate of $P_w$ is the height from the ground to the point detected in the image.

In the example Where the agricultural objects of interest are corn ears, the bounding box corner with the lowest resultant height usually corresponds directly with the base of the corn ear. Therefore, height is independently evaluated for each corner and the lowest height is saved for that corner.

Next, an example of determining measurements of agricultural objects of interest by execution of the analysis algorithm 76 by the robotic management computing device 60 when the camera 46 is a depth camera is set forth below. Most commercially available cameras with depth capability do all the prepossessing necessary to generate an RGBD image. That is, an image where each pixel is assigned a depth value. With this, $P_i$ can be used to directly determine z $P_c$. These cameras also typically provide the camera calibration parameters K, so:

$$wP_i = KP_c \quad (6)$$

$$w\begin{bmatrix}u\\v\\1\end{bmatrix} = K\begin{bmatrix}d\\y\\z\end{bmatrix} \quad (7)$$

Since the multiplying by K is the identity operation for the depth coordinate, w must equal z and therefore the robotic management computing device 60 can find $P_c$ and then $P_w$.

$$P_c = zK\begin{bmatrix}u\\v\\1\end{bmatrix} \quad (8)$$

$$P_w = [R|t]^{-1} P_c \quad (9)$$

Taking the height coordinate of $P_w$ directly gives the height of the ear which is the object of interest in this example, although other measurements could be determined and utilized.

In other examples, the analysis algorithm 76 executed by the robotic management computing device 60 may also comprise a counting algorithm to count each instance of a marker or other feature on each of the agricultural objects of interest. By way of example only, the marker or feature may be discolorations, blemishes, textural changes, or structural changes that can be associated with particular actions to be initiated, such as targeted fertilization, initiating of application of pesticides, management of irrigation, and generation and/or transmission of one or more messages or providing one or more reports to one or more designated user at one or more registered computing devices, such as a plot by plot report on corn ear height by way of example. This exemplary counting may be programmed to identify and track of each of the agricultural objects of interest to avoid double counting or double use of any of the agricultural objects of interest in any executed analytics. By way of example, the executed counting algorithm may identify and give each agricultural object of interest and/or other maker or feature a unique tracking identifier in each image or frame in captured image data.

In step 408, the robotic management computing device 60 may also be configured to filter any outliers in the measurements of the detected agricultural objects of interest. By way of example, when the camera 46 is a monocular camera, then given a fixed distance to row, the distance from the origin of the ray to its intersection with the plane is a function of the angle between the ray and the normal of the plane. The closer that angle is to 90°, the more sensitive the distance is to changes in the angle. This means that points that are far away have a greater uncertainty associated with the measurement and therefore would have an unreliable height measurement. To counteract this, the robotic management computing device 60 may implement a threshold which discards all points that exceed a certain distance away from the camera center.

In the depth camera case, commercially available cameras have a variety of settings which allow for it to return null values for depth in the pixels it decides it is not confident in. This naturally lends itself to filtering out measurements that would have otherwise been bad. If masks are used for detection, the depth values across multiple pixels in an object can be used to determine a signal depth estimate with more confidence. Further, after measurements of all agricultural objects of interest, such as ear heights have been gathered, statistical outliers based on interquartile range of the data are discarded by the robotic management computing device 60. Since the end metric is average height in a plot, outliers are aggressively, discarded to ensure the mean is reasonably representative of the data.

In step 410, the robotic management computing device 60 may utilize the determined measurements and/or other processing of the determined measurements, such as an average measurement by way of example, to initiate one or more actions related to the agricultural objects of interest in the dynamic environment. By way of example only, the initiated actions by the robotic management computing device 60 may comprises initiation of targeted fertilization, initiating of application of pesticides, management of irrigation, and generation and/or transmission of one or more messages or providing one or more reports to one or more designated user at one or more registered computing devices, such as a plot by plot report on corn ear height. Additionally, the determined measurements and/or other processing of the determined measurements, such as specific plant or other crop status information, can be associated with the particular ones of the optional EU IDs to provide precise location or position information for assisting with managing one or more actions.

Exemplary Results

Figure 5:
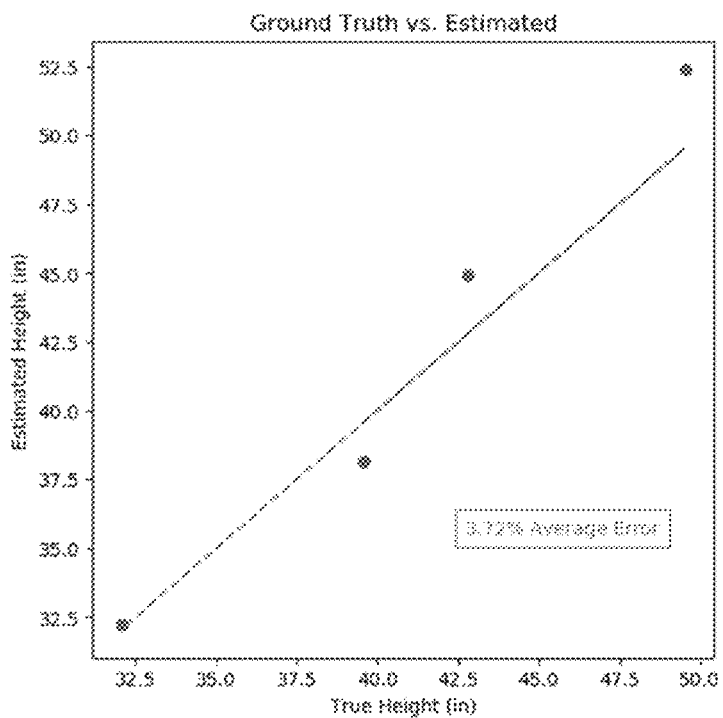
FIG. 5 is a graph of an example of manually selected points on image data with measured points of agricultural objects of interest with an example of the robotic system.

An example of the robotic system 10 with a monocular camera as the camera 46 was tested. Referring to FIG. 5, a graph depicting testing of manually selected points on image data with measured points of agricultural objects of interest by the robotic management computing device 60 is illustrated. In this example, five data points were collected of individual corn stems and then our algorithm predicted the height. The analysis algorithm 76 executed by the robotic management computing device 60 filtered out one of the points due to a large depth value. The error is defined as:

$$\frac{|actual - estimate|}{actual}$$

Since detection was manually done, this showed that the mathematical calculations were implemented correctly by the robotic management computing device 60, and that the outlier filtering worked well to combat noisy sensory measurements.

Figure 6:
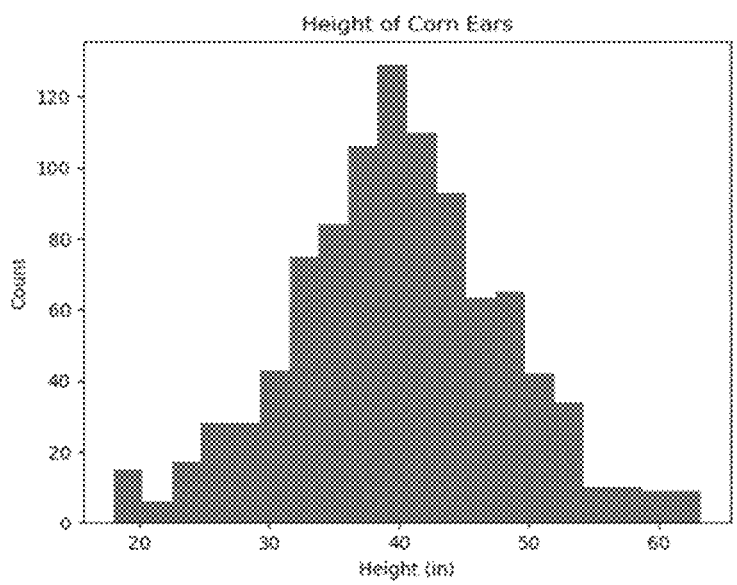
FIG. 6 is a graph of performance of field data spanning multiple plots when deep learning detection is utilized in a detection algorithm in an example of the robotic system.
Figure 7:
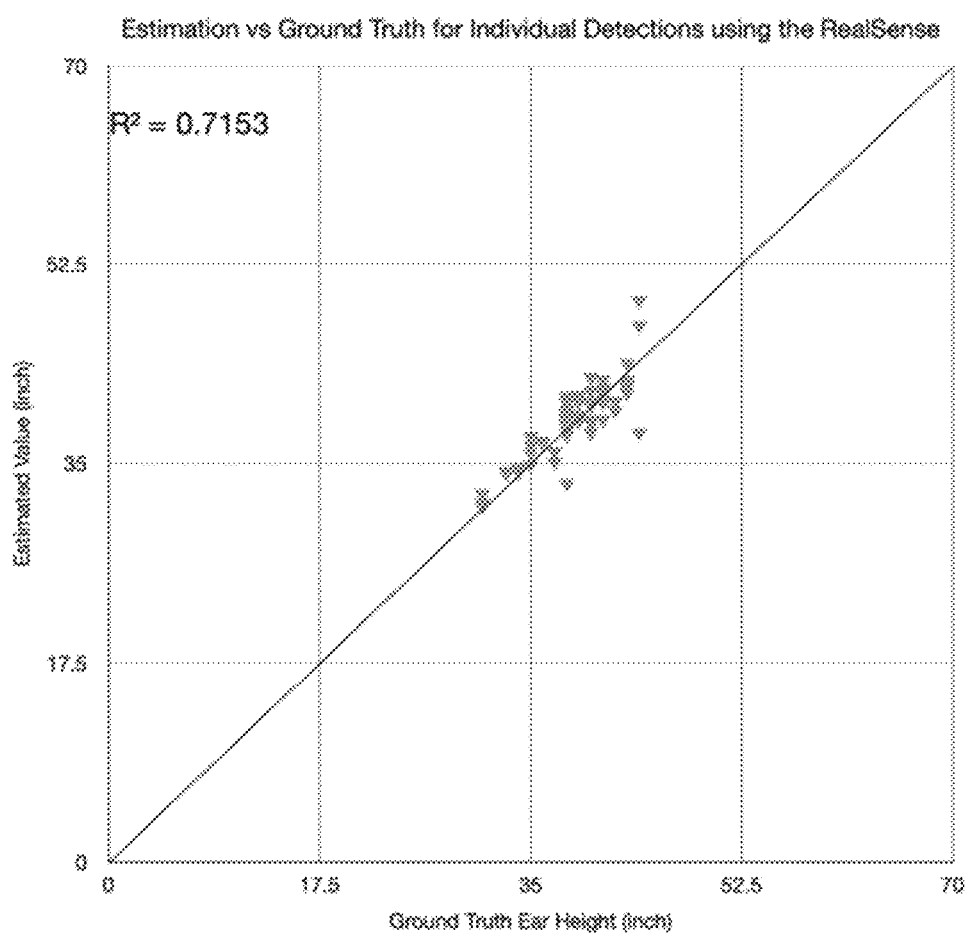
FIG. 7 is a graph of exemplary data points of height of corn ears collected with another example of the robotic system with a depth camera.
Figure 8:
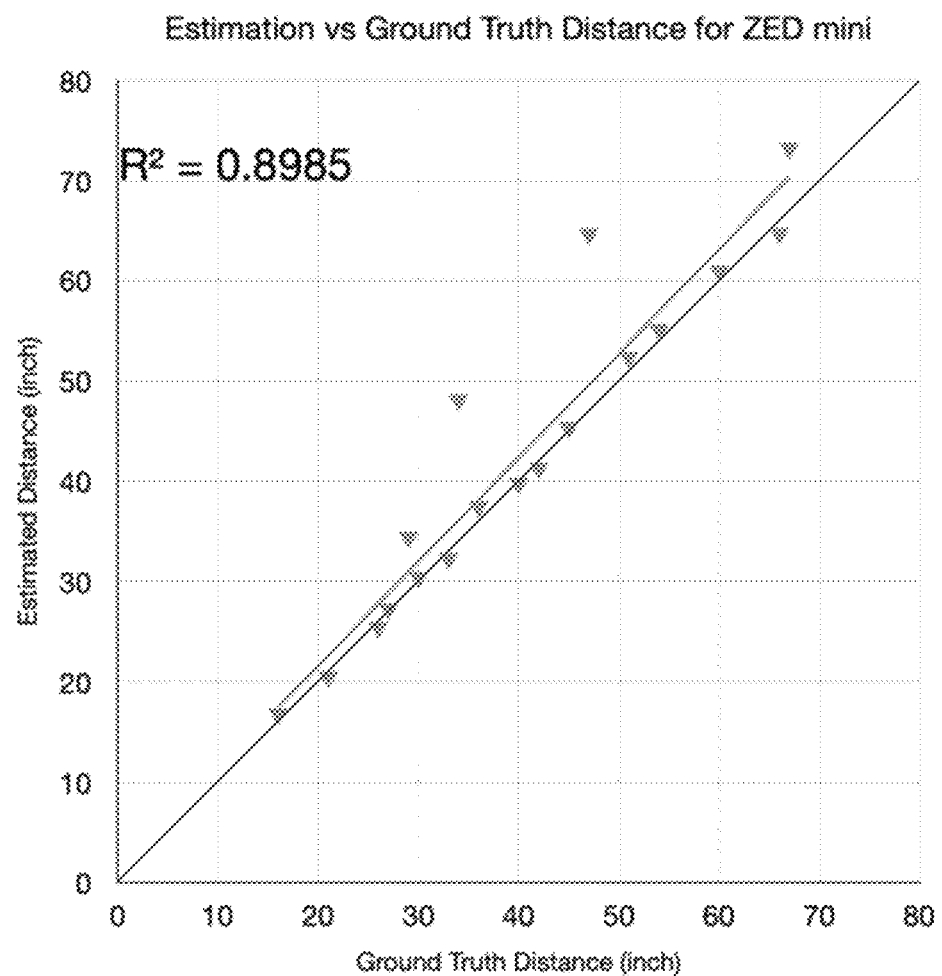
FIG. 8 is a graph of exemplary plot of data points of height of corn ears collected with another example of the robotic system with another depth camera.

Referring to FIG. 6, a graph depicting performance of field data spanning multiple plots when deep learning detection is utilized in the detection algorithm 76 in the robotic management computing system 60. The distribution of points is unimodal and appears Gaussian in nature, which aligns with the way corn ear heights are distributed based on ground truth measurements. The variance of the distribution is within expectation, and more importantly, the mode and mean of the distribution accurately estimate the ground truth average to within two inches for this video sample.

An example of the robotic system 10 with a depth camera as the camera 46 was tested. In this example, the depth camera used active IR stereo technology to achieve its depth map. To test out how well it performs in the field environment, data was collected in a 10 m span of corn with a particularly high range of ear height values. Signs were placed below each ear indicating the height of that ear, so the height of each corn ear could be inferred from the images alone. To eliminate the dependence of the system performance of a deep learning object detector, image coordinates of corn ears were chosen manually every five frames of the video. Aggregating all points and comparing against the ground truth gives the results shown in the graph in FIG. 7. This graph indicates a strong result, where even individual measurements have a strong correlation with the ground truth. This means that not only does this example of the technology yield accurate average measurements, but can also give valuable information about the distribution of ear heights, for example if the distribution of heights is bimodal.

Yet another example of the robotic system 10 with another depth camera as the camera 46 was tested. In this example, the depth camera used stereo vision to achieve its depth map. That means that it used visual cues in the RGB images captured by two adjacent cameras to construct a map, much like our eyes would. In this example, the method used to evaluate the depth camera in the prior example cannot be used here, because the sign would affect the measurement. Instead, two types of images are taken in a static, but dense and diverse, field environment. One with and one without signs indicating distance from the location of the sign and the camera. Care was taken to ensure and check that the environment did not change when adding the signs, so that points $P_i$ could be chosen from the image with signs and depths sampled from the image without signs. Since estimates can fluctuate over time, five images are taken for each setup, and five points were manually sampled from each image, totaling 25 points per sign. This is roughly the way a mask would be sampled. Averaging across 25 points per sign yields the results in the graph shown in FIG. 8. In this example, the estimates having almost no error. All notable errors are overestimates, which result from using the fill option when estimating depth.

Accordingly, as illustrated and described by way of the examples herein this technology enables providing robotic systems and methods that accurately, efficiently, and reliably manage agricultural analysis in dynamic environments. With examples of this technology, fast, cheap, and reliable measurements of corn ear height at a high level of accuracy can be obtained. Additionally, examples of this technology provide a robotic system which can provide a fully automated measurement system for agricultural objects of interest, such as corn ear height, in an entire agricultural field or other dynamic environment without needing any human intervention. With this technology, a variety of different measurements may be Obtained, such as the height or geometry (distance, angle, volume, etc.) of any object of interest, such as an organ of a plant, including but not limited to, leaves, tassels, stem, brace roots, etc.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
    detecting, by one or more processors, a location of an agricultural object of interest in image data received from a sensor device;
    wherein detecting the location further comprises:
        executing, by the one or more processors, a first detection neural network to identify the agricultural object of interest in the image data, wherein the first detection neural network is trained by transferring weights, from a second detection neural network trained for a previously selected crop or other agricultural object of interests, to the first detection neural network;
    determining, by the one or more processors, orientation of the sensor device and position of the sensor device based on at least one of the image data and position data, wherein the orientation of the sensor device and the position of the sensor device is determined relative to at least one of a row of crops, a plane in which the agricultural object of interest lies, and a ground; and
    analyzing, by the one or more processors, the agricultural object of interest based on the image data, the location of the object of interest, the orientation of the sensor device, and the position of the sensor device to determine one or more characteristics of the agricultural object of interest, wherein the one or more characteristics comprises at least one of measurements of height of the agricultural object of interest, geometry of the agricultural object of interest, and markers of the agricultural object of interest, wherein the agricultural object of interest comprises an organ of the plant, and wherein the organ of the plant comprises at least one of leaves, tassels, stem, ear of corn, and brace roots.

2. The method of claim 1, wherein the position data comprises roll and pitch estimates of the sensor device, and wherein the sensor device is an imaging device comprising at least one of a monocular camera, a stereo camera, a light detection and ranging (LIDAR) system, and a depth camera.

3. The method of claim 1, wherein detecting the location further comprises:
    the detection neural network is further trained using prior stored image data in different types of imaging conditions where different related types of the agricultural object of interest have already been identified and a set of new image data of the agricultural object of interest, and wherein the different types of imaging condition comprises visual clutter, motion blur, harsh lighting conditions, and changing lighting conditions.

4. The method of claim 1, wherein detecting the location further comprises:
    determining, by the one or more processors, at least one of a bounding box and a pixel mask for each of the one or more agricultural objects of interest, wherein analyzing each of the one or more agricultural objects of interest is further based on at least one of the determined bounding box and the pixel mask.

5. The method of claim 1, wherein analyzing the agricultural object of interest to determine the one or more characteristics further comprises:
    calculating, by the one or more processors, one or more measurements of the agricultural object of interest.

6. The method of claim 1, wherein analyzing the agricultural object of interest to determine the one or more characteristics further comprises:
    counting, by the one or more processors, at least one of an instance of the agricultural object of interest and a marker on the agricultural object of interest.

7. The method in claim 6, wherein the counting further comprises:
    executing, by the one or more processors, a counting algorithm to identify and track the agricultural object of interest.

8. The method in claim 5, wherein calculating the one or more measurements further comprises:
    determining, by the one or more processors, the plane on which the agricultural object of interest lies and a ray from the sensor device to the agricultural object of interest, wherein analyzing the agricultural object of interest to determine one or more characteristics is further based on the determined plane and the determined ray.

9. The method of claim 1, wherein the sensor device comprises one or more depth imaging devices to obtain depth data with respect to the agricultural object of interest, wherein analyzing the agricultural object of interest is further based on the obtained depth data.

10. The method in claim 5, further comprises:
    identifying, by the one or more processors, outliers in the one or more measurements based on one or more stored thresholds; and
    filtering, by the one or more processors, the identified outliers in the one or more measurements.

11. The method of claim 1, wherein the markers of the agricultural object of interest comprise at least one of discolorations, blemishes, textural changes, and structural changes in the agricultural object of interest.

12. A system comprising:
    a sensor system; and
    a management computing device coupled to the sensor system comprising a memory comprising programmed instructions stored thereon and one or more processors configured to be capable of executing the stored programmed instructions for:
        detecting a location of an agricultural object of interest in image data received from a sensor device;
        wherein detecting the location further comprises:
            executing, by the one or more processors, a first detection neural network to identify the agricultural object of interest in the image data, wherein the first detection neural network is trained by transferring weights, from a second detection neural network trained for a previously selected crop or other agricultural object of interests, to the first detection neural network;

determining orientation of the sensor device and position of the sensor device based on at least one of the image data and position data, wherein the orientation of the sensor device and the position of the sensor device is determined relative to at least one of a row of crops, a plane in which the agricultural object of interest lies, and a ground; and analyzing the agricultural object of interest based on the image data, the location, the orientation, and the position to determine one or more characteristics of the agricultural object of interest, wherein the one or more characteristics comprises at least one of measurements of height of the agricultural object of interest, geometry of the agricultural object of interest, and markers of the agricultural object of interest, and wherein the agricultural object of interest comprises an organ of the plant, and wherein the organ of the plant comprises at least one of leaves, tassels, stem, ear of corn, and brace roots.

13. The system in claim 12, wherein the sensor system comprises at least one of the sensor device, an inertial measurement unit (IMU), one or more encoders, and a light detection and ranging (LIDAR) system, and wherein the sensor device is an imaging device comprising at least one of a monocular camera, a stereo camera, and a depth camera.

14. The system in claim 12, wherein the position data comprises roll and pitch estimates of the sensor device.

15. The system in claim 12, wherein detecting the location further comprises:
the detection neural network is further trained using prior stored image data in different types of imaging conditions where different related types of the agricultural object of interest have already been identified and a set of new image data of the agricultural object of interest, and wherein the different types of imaging condition comprises visual clutter, motion blur, harsh lighting conditions, and changing lighting conditions.

16. The system in claim 12, wherein detecting the location further comprises:
determining at least one of a bounding box and a pixel mask for each of the one or more agricultural objects of interest, wherein analyzing each of the one or more agricultural objects of interest is further based on at least one of the determined bounding box and the pixel mask.

17. The system in claim 12, wherein analyzing the agricultural object of interest to determine the one or more characteristics further comprises:
calculating one or more measurements of the agricultural object of interest.

18. The system in claim 12, wherein analyzing the agricultural object of interest to determine the one or more characteristics further comprises:
counting at least one of an instance of the agricultural object of interest and a marker on the agricultural object of interest.

19. The system in claim 18, wherein the counting further comprises:
executing a counting algorithm to identify and track the agricultural object of interest.

20. The system in claim 17, wherein calculating the one or more measurements further comprises:
determining the plane on which the agricultural object of interest lies and a ray from the sensor device to the agricultural object of interest, wherein analyzing the agricultural object of interest to determine one or more characteristics is further based on the determined plane and the determined ray.

21. The system in claim 12, wherein the sensor device comprises one or more depth imaging devices to obtain depth data with respect to the agricultural object of interest, wherein analyzing the agricultural object of interest is further based on the obtained depth data.

22. The system in claim 17, further comprises:
identifying outliers in the one or more measurements based on one or more stored thresholds; and
filtering the identified outliers in any of the one or more measurements.

23. A non-transitory computer readable medium having stored thereon instructions comprising executable code which, when executed by one or more processors, causes the one or more processors to:
detect a location of an agricultural object of interest in image data received from a sensor device;
wherein detection of the location further comprises:
execute, by the one or more processors, a first detection neural network to identify the agricultural object of interest in the image data, wherein the first detection neural network is trained by transferring weights, from a second detection neural network trained for a previously selected crop or other agricultural object of interests, to the first detection neural network;
determine orientation of the sensor device and position of the sensor device based on at least one of the image data and a position data, wherein the orientation of the sensor device and the position of the sensor device is determined relative to at least one of a row of crops, a plane in which the agricultural object of interest lies, and a ground; and
analyze the agricultural object of interest based on the image data, the location, the orientation, and the position to determine one or more characteristics of the agricultural object of interest, wherein the one or more characteristics comprises at least one of measurements of height of the agricultural object of interest, geometry of the agricultural object of interest, and markers of the agricultural object of interest, and wherein the agricultural object of interest comprises an organ of the plant, and wherein the organ of the plant comprises at least one of leaves, tassels, stem, ear of corn, and brace roots.

* * * * *